Jan. 6, 1953     C. K. COLE     2,624,169
CUTTER BLADE SUPPORT FOR LAWN MOWERS
Filed April 10, 1951     2 SHEETS—SHEET 1
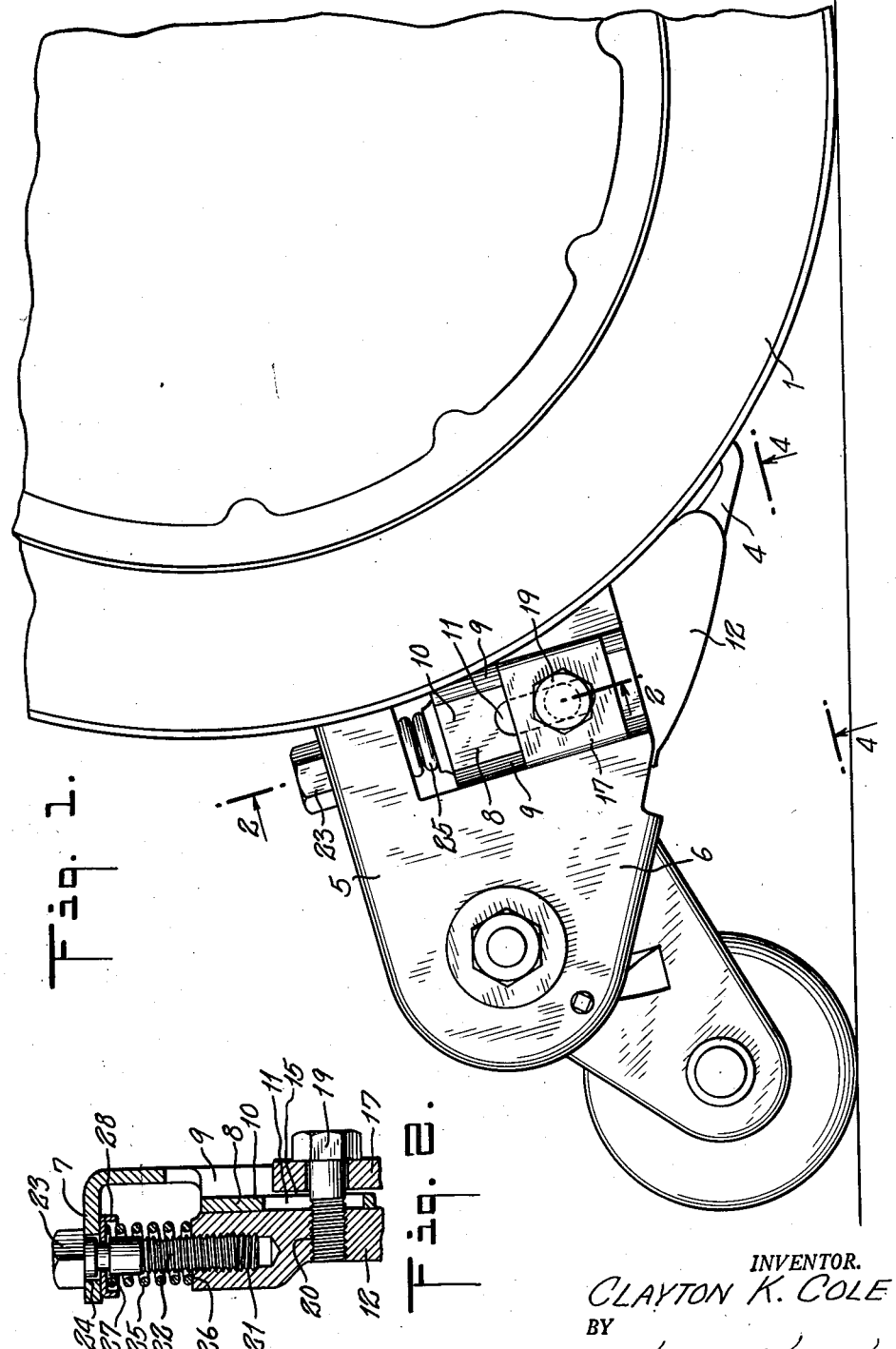
INVENTOR.
CLAYTON K. COLE
BY
Kenyon & Kenyon
HIS ATTORNEYS Jan. 6, 1953 C. K. COLE 2,624,169
CUTTER BLADE SUPPORT FOR LAWN MOWERS
Filed April 10, 1951
2 SHEETS—SHEET 2
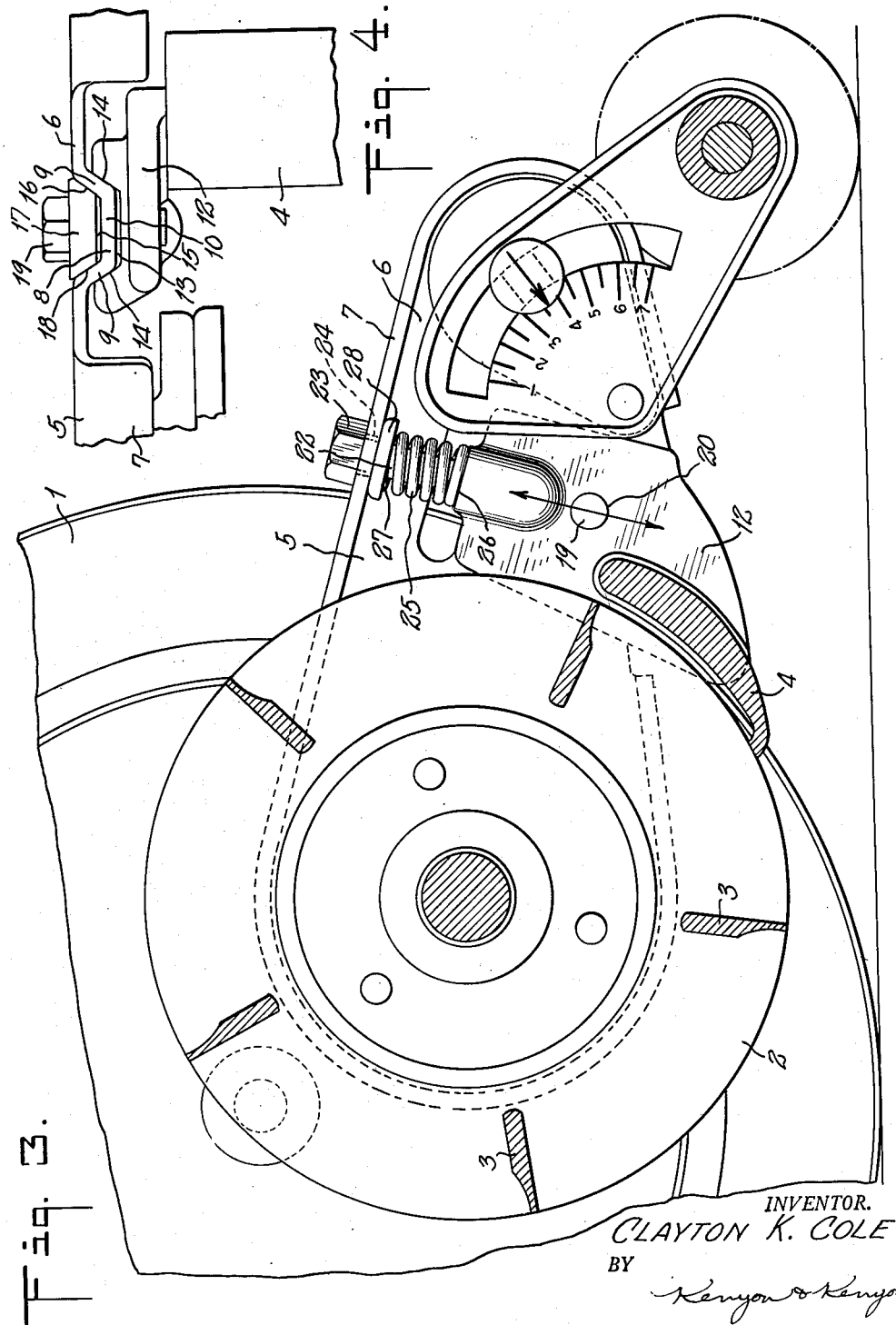
INVENTOR.
CLAYTON K. COLE
BY
Kenyon & Kenyon
HIS ATTORNEYS Patented Jan. 6, 1953

2,624,169

UNITED STATES PATENT OFFICE 2,624,169

CUTTER BLADE SUPPORT FOR LAWN MOWERS

Clayton K. Cole, Kalamazoo, Mich., assignor to Atlas Press Company, Kalamazoo, Mich., a corporation of Michigan Application April 10, 1951, Serial No. 220,279

6 Claims. (Cl. 56—249)

1

This invention relates to lawn mower constructions and particularly to lawn mower constructions which have to do with the support and adjustment of the cutter bar with which the reel cooperates in cutting the grass.

Heretofore the supports and adjustments for cutter bars for lawn mowers have been complicated and have been such that proper adjustment involved difficulties in attaining and holding the proper adjustment. One of the objects of this invention is to provide an adjustable support for the cutter bar of a lawn mower which can be made simply and inexpensively and which will overcome the above-mentioned difficulties. Another object is to provide such an adjustable support mechanism which can be adjusted to a very fine degree and in which the parts are held during adjustment so as to facilitate the adjustment. Another object of the invention is to provide a suitable clamping mechanism which will rigidly support a cutter bar and particularly one of the type which is rigid and which is maintained just out of contact with the blades of the reel. Other objects and advantages of the invention will be apparent from the following description of a preferred form of the invention which is illustrated in the accompanying drawings, in which Fig. 1 is a partial side elevation of a lawn mower embodying the invention;

Fig. 2 is a detailed sectional view taken on the line 2—2 of Fig. 1;

Fig. 3 is an elevational view of the opposite side of the mechanism shown in Fig. 1; and Fig. 4 is a view taken on the line 4—4 of Fig. 1.

The lawn mower embodying the present invention has conventional wheels 1, a cutting reel 2, which has blades 3, which rotate and cooperate with a cutter bar 4, which in this case is a section of extruded metal which is quite rigid and can be adjusted so as to just clear the blades 3 of the reel 2 when the mower is in operation. The frame of the lawn mower consists in part of a frame member 5 which is vertically disposed and consists of a body portion 6 of flat sheet metal which is provided with an inwardly-facing flange 7, one portion of which serves as a bearing member for an adjusting screw, as is pointed out hereafter. There are two such side frame members.

An inwardly-projecting way 8 is provided in each of the side frame members. It is formed from the sheet metal of the body portion by means of suitable dies. It extends in a generally vertical direction and consists of substantially vertical side walls 9 which converge from the body portion toward a central land 10 which is vertically slotted at 11.

The ends of the cutter bar 4 are mounted in slides 12 which are preferably forgings. Each of these slides has a vertically-extending groove 13 therein which is provided with side walls 14 which diverge from the bottom of the groove to form a tapered slot which fits on the converging walls 9 of the way for sliding adjustment therealong or clamping. The tapered way and the tapered groove are provided to assure proper seating and positioning as well as proper holding when the slides are clamped in position.

The formation of the way 8 leaves a groove 15 on the outer side of the body 6 of the side member 5. This groove has side walls 16 which diverge from the bottom of the groove and form a way for a clamping member 17 which is formed with tapered side walls 18 which fit in the groove 15 in wedging engagement with its side walls 16. This member is centrally apertured to receive a screw 19 which is screw-threaded into a hole 20 in the slides 12. This screw may be loosened to permit the vertical adjustment of the slide 12 along its way 8. The screw 19 extends through the slot 11 in the land 10 of the way.

To facilitate the vertical adjustment of the slides 12 each is provided with a bore 21 extending parallel to the groove 13 and the way 8. This bore is screw-threaded to receive a screw 22, which is provided with a head 23. The flange 7 is apertured at 24 to receive the screw 22 and serve as a bearing member therefor to permit rotation of said screw and to engage the head thereof to prevent downward movement of the screw during rotation. A compression spring 25 is disposed around the screw 22. One end 26 bears on the slide 12 and the other end 27 bears on the lower face of the flange 7 where it is provided with a suitable cup washer 28.

The spring 25 is under compression when the parts are assembled and when one adjusts the position of the cutter bar 4 the screw 19 is loosened to permit sliding adjustment of the slide 12 along the way 8. The vertical adjustment can be effected by rotating the screw 22 through its head 23. The spring 25 during this adjustment takes up all slack or backlash and holds the parts in position so that as the screw 22 is turned the parts are maintained in position to be firmly fixed by merely tightening the screw 19. This greatly facilitates adjustment.

A preferred form of the invention has been described above. There is no intention, however, in describing a preferred form of the invention to limit the invention to this form since other forms of the invention may be employed.

I claim:

1. In a lawn mower a pair of end frame members, each having a body portion of sheet metal and an inwardly-extending way comprising side walls of said sheet metal extending substantially vertically and converging from said body portion toward a central land having a substantially vertically-extending slot therein, a cutter bar extending between said end frame members, supporting slides therefor, each disposed for slidable adjustment and clamping on one of said ways and having an outwardly-facing, substantially vertically-extending groove having side walls diverging from the bottom of said groove to form a tapered seat to fit said way and a clamping screw extending from said slide through said slot, a bore in each of said slides extending parallel to the way, an adjusting screw threaded in each of said bores, a bearing member spaced from each slide and aligned with its bore and rotatably supporting said screw, and a compression spring surrounding said screw and bearing at one end on said slide and at its other end on said bearing member to take up lost motion.

2. In a lawn mower a pair of end frame members, each having a body portion and an inwardly-extending way comprising side walls extending substantially vertically and converging from said body portion toward a central land having a substantially vertically-extending slot therein, a cutter bar extending between said end frame members, supporting slides therefor, each disposed for slidable adjustment and clamping on one of said ways and having an outwardly-facing substantially vertically-extending groove having side walls diverging from the bottom of said groove to form a tapered seat to fit said way and a clamping screw extending from said slide through said slot, a bore in each of said slides extending parallel to the way, an adjusting screw threaded in each of said bores, a bearing member spaced from each slide and aligned with its bore and rotatably supporting said screw, and a compression spring surrounding said screw and bearing at one end on said slide and at its other end on said bearing member to take up lost motion.

3. In a lawn mower a pair of end frame members, each having a body portion and an inwardly-extending way extending substantially vertically and having a substantially vertically-extending slot therein, a cutter bar extending between said end frame members, supporting slides therefor, each disposed for slidable adjustment and clamping on one of said ways and having an outwardly-facing, substantially vertically-extending groove to fit said way and a clamping screw extending from said slide through said slot, a bore in each of said slides extending parallel to the way, an adjusting screw threaded in each of said bores, a bearing member spaced from each slide and aligned with its bore and rotatably supporting said screw, and a compression spring surrounding said screw and bearing at one end on said slide and at its other end on said bearing member to take up lost motion.

4. In a lawn mower a pair of end frame members, each having a body portion and a way extending substantially vertically and a cutter bar extending between said end frame members, supporting slides therefor, each disposed for slidable adjustment and clamping on one of said ways and a bore in each of said slides extending parallel to the way, an adjusting screw threaded in each of said bores, a bearing member spaced from each slide and aligned with its bore and rotatably supporting said screw, and a compression spring surrounding said screw and bearing at one end on said slide and at its other end on said bearing member to take up lost motion.

5. In a lawn mower a pair of end frame members, each having a body portion of sheet metal and an inwardly-extending way comprising side walls of said sheet metal extending substantially vertically and converging from said body portion toward a central land having a substantially vertically-extending slot therein, a cutter bar extending between said end frame members, supporting slides therefor, each disposed for slidable adjustment and clamping on one of said ways and having an outwardly-facing, substantially vertically-extending groove having side walls diverging from the bottom of said groove to form a tapered seat to fit said way and a clamping screw extending from said slide through said slot.

6. In a lawn mower a pair of end frame members, each having a body portion and an inwardly-extending way comprising side walls extending substantially vertically and converging from said body portion toward a central land having a substantially vertically-extending slot therein, a cutter bar extending between said end frame members, supporting slides therefor, each disposed for slidable adjustment and clamping on one of said ways and having an outwardly-facing, substantially vertically-extending groove having side walls diverging from the bottom of said groove to form a tapered seat to fit said way and a clamping screw extending from said slide through said slot.

CLAYTON K. COLE.

REFERENCES CITED

The following references are of record in the file of this patent:

UNITED STATES PATENTS

| Number | Name | Date |
|---|---|---|
| 2,174,826 | Goodacre | Oct. 3, 1939 |
| 2,329,383 | Bly | Sept. 14, 1943 |
| 2,335,054 | Godwin | Nov. 23, 1943 |